United States Patent Office 3,525,684
Patented Aug. 25, 1970

3,525,684
CATALYST AND PROCESS FOR HYDROREFINING PETROLEUM CRUDE AND RESIDUAL OILS
Mark J. O'Hara, Prospect Heights, Ill., assignor to Universal Oil Products Company, Des Plaines, Ill., a corporation of Delaware
No Drawing. Filed Nov. 13, 1968, Ser. No. 775,537
Int. Cl. C10g 23/02
U.S. Cl. 208—216                            5 Claims

ABSTRACT OF THE DISCLOSURE

A catalyst comprising a refractory inorganic oxide with from about 1 to about 5 wt. percent boron phosphate, a metal of Group VI–B and an Iron Group metal impregnated thereon and characterized by a pore volume of at least about 0.5 cc./gm. in the 117–500 A. range, said Iron Group metal having been impregnated thereon from an aqueous impregnating solution comprising an Iron Group metal halide in solution with a sufficient quantity of another salt of said metal to establish an Iron Group metal-halogen atomic ratio of from about 1:1 to about 3:1. The catalyst composite is particularly useful for hydrorefining petroleum crude oils and residual crude oils.

BACKGROUND OF THE INVENTION

The present invention relates to an improved catalyst particularly useful in the hydrorefining of petroleum crude oils and residual oils produced as a result of separating lighter fractions from petroleum crude oils. The residual oils are variously referred to as asphaltum oil, liquid asphalts, black oil, petroleum tailings, residuum, residual reduced crude, bunker fuel oils, etc. Petroleum crude oils and residual oils normally contain nitrogenous and sulfurous compounds, and heptane-insoluble asphaltenes which, alone or in combination, seriously impair the conversion of said oils to lower boiling more useful fractions thereof.

The nitrogenous and sulfurous compounds can be reduced to an acceptable level at hydrorefining conditions whereby they are converted to ammonia and hydrogen sulfide and readily separated as gaseous products. The reduction of heptane-insoluble asphaltenes is substantially more difficult. The heptane-insoluble asphaltenes which occur in petroleum crude oils and residual oils comprise a significant fraction thereof. For example, a Wyoming sour crude oil having API gravity of 23.2° at 16° C. have been shown to contain about 8.37 wt. percent pentane-insoluble asphaltenes. These compounds tend to deposit within a reaction zone and on the catalyst situated therein forming a gummy hydrocarbonaceous residue which functions as a coke precursor. The deposition of this residue constitutes a significant loss of product and it is economically desirable to convert such asphaltenes into useful hydrocarbon fractions.

The hydrorefining process herein contemplated affords the advantage of converting heptane-insoluble asphaltenes into heptane-insoluble hydrocarbons. The catalyst of this invention effects said conversion at hydrorefining conditions without incurring the relatively rapid deposition of coke and other hydrocarbonaceous matter. Further, depending on process conditions and the character of the crude or residual crude oil being processed, a substantial portion of the feed stock can be simultaneously hydrocracked to yield gasoline, kerosene, fuel oil or other valuable liquid products.

It is an object of this invention to provide an improved catalyst particularly adapted to hydrorefining of petroleum crude oils and residual crude oils. It is a further object to present a hydrorefining process for the conversion of petroleum crude oils and residual crude oils to lower boiling petroleum products of reduced asphaltene content.

SUMMARY OF THE INVENTION

In one of its broad aspects, the present invention embodies a catalyst comprising a refractory inorganic oxide with from about 1 to about 5 wt. percent boron phosphate and a metal of Group VI–B and an Iron Group metal impregnated thereon and characterized by a pore volume of at least about 0.5 cc./gm. in the 117–500 A. range, said Iron Group metal having been impregnated thereon from an aqueous impregnating solution comprising an Iron Group metal halide in solution with a sufficient quantity of another salt of said metal to establish an Iron Group metal-halogen atomic ratio of from about 1:1 to about 3:1.

One of the more specific embodiments relates to a catalyst comprising alumina composited with silica in a weight ratio of from about 1.5:1 to about 3:1 with from about 1 to about 5 wt. percent boron phosphate, from about 5 to about 20 wt. percent molybdenum and from about 0.1 to about 10 wt. percent nickel impregnated thereon and characterized by a pore volume of at least about 0.5 cc./gm. in the 117–500 A. range, said nickel having been impregnated thereon from an aqueous impregnating solution comprising nickel chloride in solution with a sufficient quantity of nickel nitrate to establish a nickel-chlorine atomic ratio of from about 1:1 to about 3:1. Other objects and embodiments of this invention will become apparent with reference to the following detailed specification.

The refractory inorganic oxide component of the catalyst composite of this invention, while serving as a carrier for the other catalytic components, contributes to the overall activity and stability of the catalyst composite. Suitable refractory inorganic oxides include alumina, silica, zirconia, boria, thoria, etc., or combinations thereof, particularly alumina in combination with one or more refractory inorganic oxides. Alumina composited with silica in a weight ratio of from about 1.5:1 to about 9:1, preferably from about 1.5:1 to about 3:1, is a particularly suitable refractory inorganic oxide and the further description of the catalyst composite of this invention is presented with reference thereto.

Many methods are known for preparing the preferred alumina-silica component. The simplest and most widely practiced methods involve either the precipitation of one of the components, alumina or silica, from a sol as a gel, said gel being thereafter impregnated with a solution of a suitable gel precursor of the other component which is thereafter precipitated to form an alumnia-silica cogel, or alternatively, both components, alumina and silica, may be coprecipitated from a common sol. In the latter case it is most convenient to prepare an acidic silica sol and an alumina sol and then commingle the sols in the desired proportion. Alumina-silica composites comprising alumina in at least an equimolar amount with silica are especially well prepared by this last described method.

Several alternative procedures are available for preparing an acidic silica sol. In one method, a suitable mineral acid such as hydrochloric acid, sulfuric acid, or nitric acid is added to an aqueous solution of an alkali metal silicate, sodium silicate being preferred because of its low cost and general availability. In a second method, the order of addition is reversed, the water glass being added to the acid. The latter technique is preferred since the formation of the silica sol always occurs under acid conditions and there is no danger of the sol prematurely solidifying as is the case in the former method when the pH of the system is reduced from a high value to a low value. When using hydrochloric or sulfuric acid, concentrations thereof of from about 10% to about 30% are satisfactory. The water glass solution may be prepared from commercial sodium silicates, such as Philadelphia Quartz Company, brands, "E," "M," "N," or "S." The commercial water glass is first diluted with water to reduce the silica concentration thereof to about 5–15 wt. percent. The commingling of acid and water glass is preferably carried out with agitation and at a temperature below about 35° C. The pH of the acidic sol at this stage will be in the range of 1.5–2. If desired, the silica sol may be aged at this pH for a period of 0.1–1 hour or more.

While an alumina sol precursor, such as an aqueous solution of aluminum sulfate, aluminum chloride or aluminum nitrate may be commingled with the silica sol, it is preferable to employ a true alumina sol. One method of preparing an alumina sol is in the electrolysis of an aluminum salt solution, such as an aqueous aluminum chloride solution, in an electrolytic cell having a porous partition between the anode and the cathode whereby an acid anion deficient aluminum salt solution, or sol, is recovered from the cathode compartment. Preferably, the alumina sol is an aluminum chloride sol prepared by treating an excess of aluminum particles in aqueous hydrochloric acid and/or aluminum chloride solution, usually at about reflux temperature until a quantity of aluminum has been digested sufficient to form a sol of a predetermined aluminum/chloride ratio which influences the pore volume and pore diameter characteristics of the alumina-silica composite as hereinafter related.

The separately formulated silica and alumina sols are then blended to yield an acidic hyldrosol of alumina and silica. The alumina sol may be added to the silica sol, or the silica sol may be added to the alumina sol, or both may be continuously admixed as with an in-line blender. The mixing should be done with agitation and with water addition, if necessary, to prevent premature gelation at this point, since the blended sol is undergoing some polymerization as viscosity increases.

A preferred method of preparing the alumina-silica component which affords a convenient means of developing the desired physical characteristics of the final catalyst composite relates to the cogelation of an alumina sol and a silica sol to form spherical gel particles utilizing the well-known oil drop method. Thus, an alumina sol, suitably prepared by digesting aluminum pellets in aqueous hydrochloric acid solution, is commingled with a silica sol, suitably prepared by the acidification of water glass as is commonly practiced, and the sol blend dispersed as droplets in a hot oil bath whereby gelation occurs with the formation of spheroidal particles. In this type of operation, the silica is set thermally, the alumina being set chemically utilizing ammonia as a neutralizing or a setting agent. Usually the ammonia is furnished by an ammonia precursor which is included in the sol. The ammonia precursor is suitably urea, hexamethylenetetramine, or mixtures thereof, although other weakly basic materials which are substantially stable at normal temperatures but hydrolyzable to ammonia with increasing temperature may be employed. Only a fraction of the ammonia precursor is hydrolyzed or decomposed in the relatively short period during which initial gelation occurs. During the subsequent aging process, the residual ammonia precursor retained in the spheroidal gel particles continues to hydrolyze and effect further polymerization of the alumina-silica whereby the pore characteristics of the composite are established. The alumina-silica particles are aged, usually for a period of from about 10 to about 24 hours at a predetermined temperature, usually from about 50 to about 105° C., and at a predetermined pH value. The aging time is substantially reduced utilizing pressure aging techniques. With alumina-silica ratios in the higher range, pressure aging tends to lower bulk densities.

As previously stated, the foregoing method affords a convenient means of developing the desired physical characteristics of the catalyst composite. The method includes a number of process variables which affect the alumina-silica composite. However, it should be noted that a particular process variable will not necessarily be as effective to produce a desired result with one alumina-silica ratio as with another. Generally, the aluminum-chloride ratio of the alumina sol will influence the average bulk density of the alumina-silica product and, correspondingly, the pore volume and pore diameter characteristics attendant therewith, lower ratios tending toward higher average bulk densities. Other process variables affecting the physical properties of the catalyst support include the time, temperature and pH at which the particles are aged. Usually, temperatures in the lower range and shorter aging periods tend toward higher bulk densities. Surface area properties are normally a function of calcination temperature, a temperature of from about 425° to about 815° C. being suitably employed.

The boron phosphate component, comprising from about 1 wt. percent to about 5 wt. percent of the catalyst composite, can be added to the alumina-silica, or other selected refractory inorganic oxide, utilizing an aqueous impregnating solution comprising phosphoric and boric acids, said acids being employed in equimolar amounts and in a total amount to yield a finished catalyst composite containing from about 1 wt. percent to about 5 wt. percent boron phosphate.

The catalyst of this invention further comprises a metal of Group VI–B and an Iron Group metal. The catalyst will thus comprise chromium, molybdenum, and/or tungsten in combination with one or more Iron Group metals, i.e., iron, nickel and/or cobalt. Of the Group VI–B metals, molybdenum is preferred. The Group VI–B metal comprises from about 5 to about 20 wt. percent of the final catalyst composite. The Iron Group metal, which is preferably nickel, is suitably effective in amounts to comprise from about 0.1 to about 10 wt. percent of the final catalyst composite.

While the boron phosphate and Group VI–B and Iron Group metal components can be added to the alumina-silica carrier material utilizing individual impregnating solutions thereof and in any desired sequence, it is preferred to employ a common impregnating solution. Thus, the aforesaid aqueous impregnating solution comprising phosphoric and boric acids will preferably further include a soluble compound of a metal of Group VI–B such as ammonium molybdate, ammonium paramolybdate, molybdic acid, molybdenum trioxide, ammonium chromate, ammonium peroxychromate, chromium acetate, chromous chloride, chromium nitrate, ammonium metatungstate, tungstic acid, etc.

The impregnating solution will further comprise a soluble Iron Group metal halide and another salt of said Iron Group metal. Suitable Iron Group metal halides include nickel chloride, nickel bromide, nickel fluoride, nickel iodide, cobaltous bromide, cobaltous chloride, cobaltous fluoride, cobaltous iodide, ferrous bromide, ferric bromide, ferrous chloride, ferric chloride, ferrous fluoride, ferric fluoride, ferrous iodide, etc. Suitable Iron Group metal salts which can be utilized in conjunction with the corresponding Iron Group metal halide include nickel nitrate, nickel sulfate, nickel acetate, nickel formate, cobaltous sulfate, cobaltous acetate, cobaltous nitrate, ferrous acetate, ferric formate, ferrous nitrate, ferric nitrate, ferrous sulfate, ferric sulfate, and the like. The Iron Group metal halide is employed with a sufficient quantity of another salt of said Iron Group metal to establish an Iron Group metal-halogen atomic ratio of from about 1:1 to about 3:1. Thus, in one preferred embodiment, the phosphoric acid-boric acid, Group VI–B metal impregnating solution will further comprise nickel chloride in solution with a sufficient quantity of nickel nitrate to establish a nickel-chlorine atomic ratio of from about 1:1 to about 3:1.

The improved activity of the catalyst of this invention with respect to the conversion of $C_7$-insoluble asphaltenes, as well as other advantages, is achieved by using an Iron Group metal halide in conjunction with another salt of said Iron Group metal as a source of nickel. While it is not intended to limit the present invention by any particular theory it is contemplated that the improvement results from a more completely oxidized Iron Group metal component upon subsequent oxidation of the catalyst at calcination temperature. This is based on the observation that when an impregnation solution is employed comprising nickel chloride and nickel nitrate, the result is a catalyst which, upon subsequent oxidation at calcination temperature, exhabits little if any static charge indicative of incomplete oxidation of the nickel component. On the other hand, when nickel chloride is omitted from the impregnating solution, the result is a catalyst which, upon subsequent oxidation at calcination temperature, exhibits a substantial static charge indicative of incomplete oxidation of the nickel component.

Development of the pore characteristics herein defined, i.e., a pore volume of at least about 0.5 cc. per gram in the 117–500 A. range, is particularly favored by a relatively brief steam treatment of the catalyst composite prior to calcination. The wet impregnated material may be treated in a steam atmosphere by heating the same at a temperature of from about 95° to about 205° C. and evaporating the impregnated material to dryness over a period of from about 0.5 to about 1.5 hours prior to a final calcination thereof. Suitably, the alumina-silica carrier is immersed in the impregnating solution in a rotary steam drier, soaked for a brief period of at least about 5 minutes at ambient temperature, and the impregnating solution thereafter evaporated to dryness over said period of from about 0.5 to about 1.5 hours. The catalyst composite, thus dried, is thereafter oxidized in an oxygen containing atmosphere such as air, at a temperature of from about 425° to about 815° C. for a period of from about 1 to about 8 hours or more.

The hydrorefining process, utilizing the catalyst composite of this invention, is effected by reacting the petroleum crude oil, or residual oil, with hydrogen in contact with said catalyst composite. The charge stock, admixed with hydrogen, is heated to an operating temperature in the range of from about 255° C. to about 500° C., and contacts the catalyst under an imposed pressure of from about 500 to about 5000 p.s.i.g. The total reaction zone effluent is passed into a suitable high pressure-low temperature separator in which a gaseous phase rich in hydrogen is removed and recycled to combine with fresh hydrocarbon charge. The remaining normally liquid reaction zone effluent is then introduced into a suitable fractionator or stripping column for the purpose of removing hydrogen sulfide and light hydrocarbons including methane, ethane and propane. Although the normally gaseous phase from the high pressure separator may be treated for the purpose of removing ammonia formed as a result of the destructive removal of nitrogenous compounds, a more convenient method involves the introduction of water downstream or in the gas phase from the high pressure separator, and removing said water and absorbed ammonia via suitable liquid level control means disposed in said high pressure separator. In some cases, depending on process conditions and the nature of the charge, a substantial portion of the crude oil or residual oil charge may be simultaneously hydrocracked to yield gasoline, kerosene, fuel oil, or other valuable liquid products. In other cases, the major portion of the charge may pass through the hydrorefining zone virtually unchanged except for a substantial reduction in the concentration of metals, sulfur, nitrogen, oxygen and oil-insoluble asphaltenes.

EXAMPLE

A calcined alumina-silica in the form of $\frac{1}{16}$" spheres and comprising 63 wt. percent alumina and 37 wt. percent silica was impregnated with 2 wt. percent nickel. 16 wt. percent molybdenum and 5 wt. percent boron phosphate. Impregnation was by means of an impregnating solution prepared by dissolving 123.2 gms. of 85% molybdic acid ($MoO_3$) in 250 ml. of water and 144 ml. of 28% ammonium hydroxide, and adding thereto 17.3 gms. of 85.5% phosphoric acid and 9.2 gms. of boric acid followed by 43.2 gms. of nickel nitrate hexahydrate in 34 ml. of 28% ammonium hydroxide solution. The impregnating solution was diluted to 585 ml. with water. The alumina-silica spheres (304 gms.) were impregnated in a rotary steam dryer by soaking at ambient temperature for about 10 minutes and thereafter evaporating the impregnating solution to dryness over a period of about 1.5 hours. The impregnated material was dried an additional hour at 125° C. in a drying oven and then calcined in an air atmosphere at 590° C. for about 1 hour. The catalyst product is referred to hereinafter as catalyst "A."

A second catalyst was prepared substantially as described except that, in accordance with the present invention, the impregnating solution contained only 21.5 gms. of nickel nitrate hexahydrate but also 17.6 gms. of nickel chloride hexahydrate to effect a nickel-chloride atomic ratio of 1:1. The catalyst product is designated as catalyst "B." In each instance the catalyst had a total macro pore (117–50,000 A. size) volume of about 0.64 cc./gm. with 0.38 cc./gm. being in the 117–300 A. range and 0.61 cc./gm. being in the 117–500 A. range.

The catalysts were evaluated by processing a Signal vacuum tower bottoms, characterized by an API of 8.2, 5.85% $C_7$-insoluble asphaltenes, and 3.33% sulfur, over the catalyst at a temperature of 380–425° C. under 3000 p.s.i.g. hydrogen, and at a liquid hourly space velocity of about 0.7. Hydrogen was recycled at the rate of 15,000 cubic feet per barrel of charge stock.

The first described catalyst "A" effected an 84% conversion of $C_7$-insoluble asphaltenes to $C_7$-soluble hydrocarbons while the second described catalyst "B" effected an 87% conversion. Similarly, catalyst "A" effected an 86.3% sulfur conversion as compared with a 90.3% conversion with catalyst "B."

I claim as my invention:

1. A catalyst comprising a refractory inorganic oxide comprising alumina with silica in a weight ratio of from about 1.5:1 to about 9:1 and with from about 1 to about 5 wt. percent boron phosphate, said refractory inorganic oxide having a metal of Group VI-B and nickel impregnated thereon and characterized by a pore volume of at least about 0.5 cc./gm. in the 117–500 A. range, said nickel having been impregnated thereon from an aqueous impregnating solution comprising nickel chloride in solution with a sufficient quantity of another salt of nickel in which the anion of said salt is selected from the group consisting of the nitrate, sulfate, acetate and formate to establish a nickel to chloride atomic ratio of from about 1:1 to about 3:1.

2. The catalyst of claim 1 further characterized in that said refractory inorganic oxide comprises alumina composited with silica in a weight ratio of from about 1.5:1 to about 3:1.

3. The catalyst of claim 1 further characterized in that said Group VI-B metal comprises from about 5 to about 20 wt. percent of said catalyst and said nickel comprises from about 0.1 to about 10 wt. percent thereof.

4. The catalyst of claim 1 further characterized in that said Group VI-B metal is molybdenum.

5. A hydrorefining process for the conversion of a heavy petroleum oil containing asphaltenes which comprises heating said oil in admixture with hydrogen at a temperature of from about 350° to about 525° C.

at a total pressure in excess of 500 p.s.i.g. and in contact with the catalyst of claim 1.

References Cited

UNITED STATES PATENTS

| | | | |
|---|---|---|---|
| 3,125,507 | 3/1964 | Tupman et al. | 208—216 |
| 3,262,874 | 7/1966 | Gatsis | 208—216 |
| 3,271,302 | 9/1966 | Gleim | 208—216 |
| 3,294,659 | 12/1966 | O'Hara | 208—216 |
| 3,453,219 | 7/1969 | O'Hara | 252—432 |
| 3,471,399 | 10/1969 | O'Hara | 208—216 |

DELBERT E. GANTZ, Primary Examiner

G. J. CRASANAKIS, Assistant Examiner

U.S. Cl. X.R.

252—432, 437, 455